Figure 1:
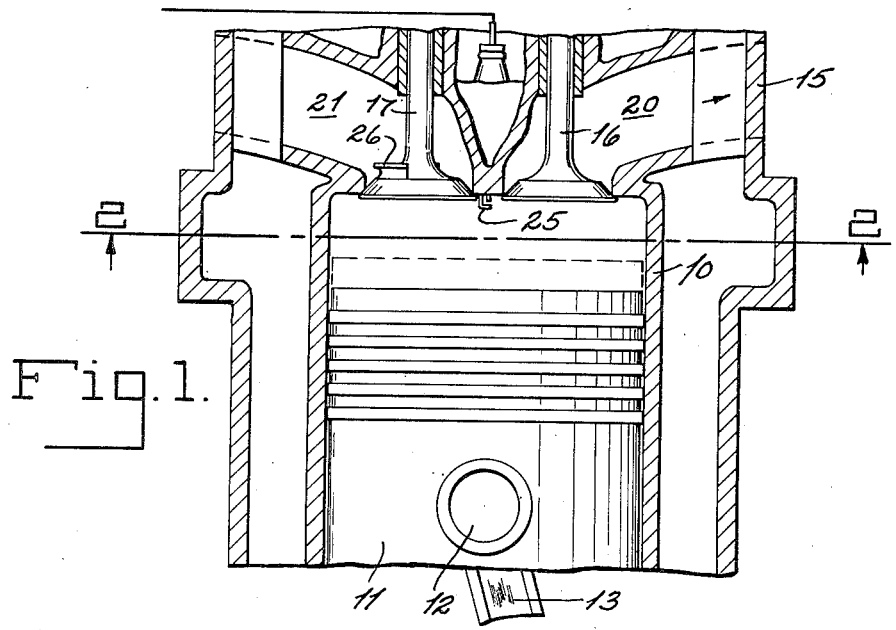

Feb. 12, 1957

J. B. MALIN 2,781,253

ENGINE GENERATION OF HYDROGEN AND CARBON MONOXIDE

Filed Dec. 14, 1950

2 Sheets-Sheet 1

INVENTOR.
JAY B. MALIN
BY
ATTORNEYS

Feb. 12, 1957 J. B. MALIN 2,781,253
ENGINE GENERATION OF HYDROGEN AND CARBON MONOXIDE
Filed Dec. 14, 1950 2 Sheets-Sheet 2

INVENTOR.
JAY B. MALIN
BY
ATTORNEYS

United States Patent Office 2,781,253
Patented Feb. 12, 1957

2,781,253

ENGINE GENERATION OF HYDROGEN AND CARBON MONOXIDE

Jay B. Malin, Whittier, Calif., assignor to The Texas Company, New York, N. Y., a corporation of Delaware Application December 14, 1950, Serial No. 200,731

3 Claims. (Cl. 48—196)

The present invention relates to the generation of synthesis gas comprising hydrogen and carbon monoxide by the partial combustion of a hydrocarbon with free oxygen in the combustion space of a cyclically operating, internal combustion engine. The process of this invention is particularly useful in the generation of carbon monoxide and hydrogen by partial combustion of a hydrocarbon gas with air, relatively pure oxygen, or oxygen-enriched air, the resulting products of which are suitable as a source of hydrogen or as feed gas for the synthesis of hydrocarbons, alcohols, or ammonia.

In one of its more specific aspects, the present invention concerns the method of generating hydrogen and carbon monoxide in an engine comprising introducing reactants to the engine combustion zone during the intake stroke or portion of the engine cycle in the proper proportions for partial combustion to hydrogen and carbon monoxide, subjecting the mixture to substantial compression, thereafter igniting the compressed mixture and causing it to burn with ensuing expansion of combustion products, withdrawing or exhausting product gas, preferably during contraction of the combustion zone, purging the combustion zone of combustion products by a gaseous purging medium, and continuously repeating the cycle to insure a continuing supply of product comprising hydrogen and carbon monoxide.

The present invention contemplates separately charging or introducing the reactants into the engine combustion zone, preferably during movement of the piston away from the cylinder head, simultaneously and into admixture with one another within the combustion zone. It also contemplates introducing premixed reactants into the combustion zone.

This application is a continuation-in-part of my copending application, Serial No. 112,326, filed August 25, 1949, now Patent 2,543,791.

The invention contemplates overlapping the exhaust or product withdrawal portion of the cycle with the admission of steam to effect substantial purging of the product gases from the combustion space and cooling of the combustion space of the engine. The use of steam is outstandingly advantageous in this connection, first, because water vapor constitutes a beneficial reactant in regulated, predetermined proportions, and second, because any excess will simply carry over into the product gas, where it is readily removable by condensation. As a result, accurate metering of the steam is not mandatory. Preferably the steam is superheaded prior to introduction into the combustion zone of the engine.

An outstanding feature of the present invention is that it overcomes the irregular and uncertain operation of combustion engine synthesis gas generators when operating on hydrocarbons and relatively pure oxygen which has been variously described as backfiring, detonation and preignition. In general, such operations are characterized by an interruption or misfire in the nature of a backfire in which the engine loses several cycles until something approaching regular operation is reached, at which time the difficulty tends to reoccur. The net result is a continuing irregularity of operation with material loss in developed mechanical energy and an inferior yield and purity of the synthesis gas.

Admission of the reactant gases during the intake portion of the cycle ordinarily results in a contact of the highly reactive oxygen with highly combustible, residual product gas, which frequently is still in the final stages of partial combustion and in contact with parts of the engine, or carbon deposits, which are at relatively high temperature. Manifestly, under these conditions, misfiring will always be imminent.

In accordance with the present invention the residual hot combustion product gases are swept away and diluted with a purge medium during which operation substantial cooling occurs. Therefore, when reactants are subsequently admitted, the residual products are so diluted and temperatures are sufficiently below the combustion range as to prevent uncontrolled burning of the mixture.

Figure 2:
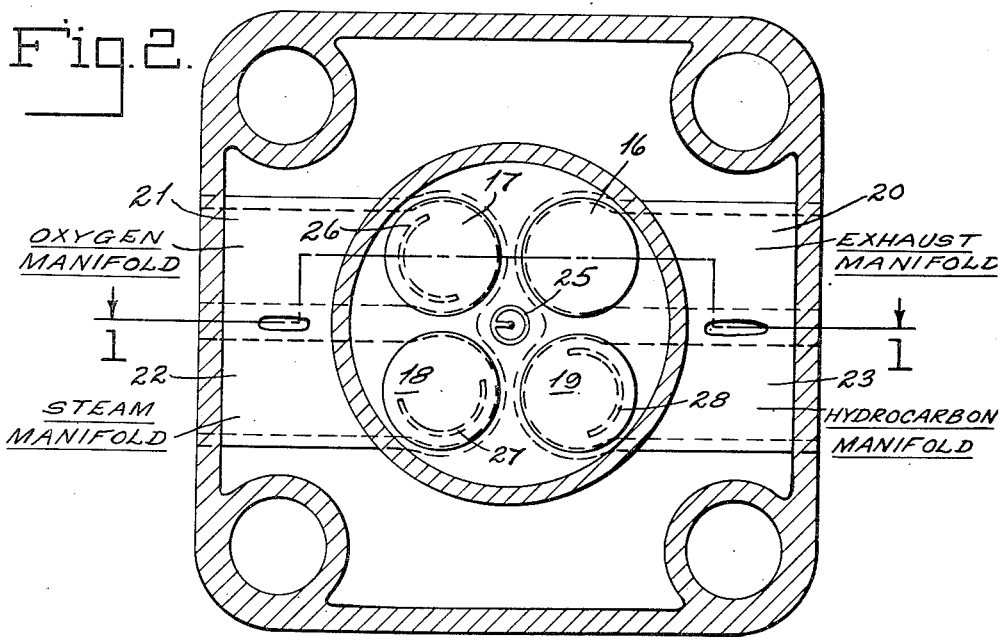
Figure 3:
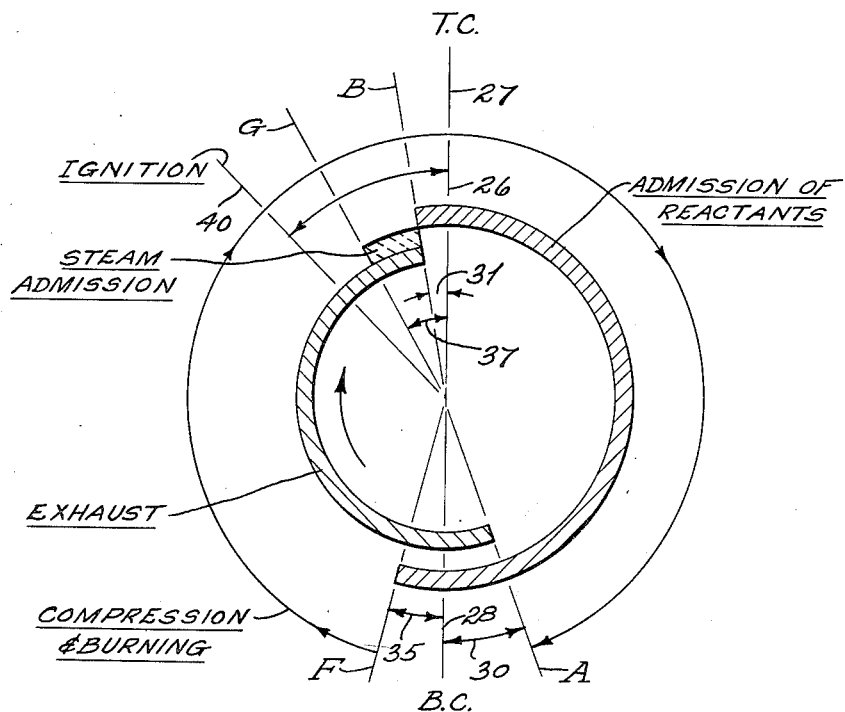

In order to more specifically disclose the present invention in greater detail, reference is had to the attached drawing, wherein Figures 1 and 2 show, respectively, vertical and horizontal sectional views of a combustion engine cylinder embodying the principles of the present invention, and Figure 3 is a diagrammatic representation of a typical operating cycle.

In the engine disclosed in Figures 1 and 2, which may be of a multicylinder type, an individual cylinder designated by the reference numeral 10 receives a vertically reciprocating piston 11, attached through pin 12 and connecting rod 13 to crank shaft, not disclosed, which delivers the available mechanical energy. A cylinder head 15 is provided, wherein four separate valves 16, 17, 18, and 19 lead respectively to individual manifolds 20, 21, 22, and 23.

In the embodiment disclosed, manifold 20 receives a product gas through exhaust valve 16. Manifolds 21 and 23, respectively, supply a stream of pure oxygen and a stream of gaseous hydrocarbon. Manifold 22 supplies steam under pressure through valve 18.

Ignition is effected by means of a spark plug 25 connected with electrical igniting means, not shown, and timed as will hereinafter be disclosed in greater detail.

Valves 17, 18 and 19 are preferably shrouded as indicated at 26, 27, and 28 with annularly disposed projections arranged to insure high turbulence and therefore complete mixing of the admitted reactants by effecting admission or injection in about the same rotational direction with reference to the axis of the cylinder. It will be understood that the exact arrangement or construction of the mixing shrouds does not, per se, form an essential part of the present invention, and accordingly, this construction is not shown in detail. Actually, it has been found that shrouds extending annularly through 90–180° of the valve are effective when faced in generally the same rotational direction. However, this construction may obviously be varied widely to secure adequate mixing and alternatively, provision of directional intake ports and/or turbulence producing cylinder head arrangements may be substituted for this purpose.

In accordance with one embodiment of the present invention, provision, not shown, is made for timing the operation of the valves and ignition means in accordance with the diagram set forth in Figure 3.

Therein, progressing in a clockwise direction from the point "A" there is symbolized the complete cycle of operation in the case of a typical four-stroke cycle reciprocating engine. The vertical line 26 symbolizes the angular position of the combustion engine cylinder axis. Therefore, point 27 represents top dead center and point 28 bottom dead center. Accordingly, the angular movement on the right hand side of the line 26 covers the approximate intake and combustion or burning portions of the cycle, whereas the opposite side of the diagram relates, in general, to the compression and exhaust portions of the cycle.

Beginning with the exhaust portion of the cycle at the angular position "A" the exhaust valve opens, preferably though not necessarily, somewhat in advance of bottom dead center, and remains open throughout approximately the entire upstroke of the piston, as represented by the shaded area entitled "Exhaust," during which the product gas produced in a previous cycle of operation flows through outlet valve 16 into the exhaust manifold 20. In the cycle shown, the exhaust valve opens at 20° before bottom center, and closes at 10° before top center as indicated by the angular distance 30 and 31 respectively.

At a point of angular position "G" 30° before top center, that is, 20° before the exhaust valve is closed, steam injection valve 18 opens, sweeping the residual product gas through outlet valve 16.

At approximately top dead center, and preferably somewhat in advance thereof, at an angular position "B," both the hydrocarbon gas inlet valve 19 and the oxygen valve 17 open so the reactants under pressure enter from manifolds 21 and 23. Admission of the reactants, in the specific embodiment selected, takes place an angular distance 31 of 10° before top center and continues throughout the shaded portion of the cycle entitled "Admission of Reactants" to the angular position "F," preferably about or slightly after bottom dead center, and specifically 15° after bottom dead center as indicated by arc 35.

Following this point, with the valves closed, the engine goes through almost a complete revolution in which the mixed gases are compressed, subjected to ignition at point 40, and thereafter burned as indicated in the line designated as "Compression and Burning" which continues to angular position "A," at which the four-stroke cycle of operation is repeated.

As above indicated, the period of opening of the steam injection valve is not extremely critical since any small amounts of steam or water vapor carried off with the product gas through the outlet manifold 20 are readily removable by condensation.

It is to be understood that there is a wide permissible variation of valve and ignition timing from those disclosed in the above specific example. For example, opening of the exhaust valve usually takes place anywhere from 40° before to 40° after bottom center, but preferably, at least 10° in advance of bottom center. While the exhaust valve normally closes at about top dead center, it may be adjusted in accordance with engine characteristics to close from 20° in advance to 20° beyond top center.

In order to effect efficient charging of reactants, the hydrocarbon gas valve and oxygen valve advantageously open about or before top center, as for example, as much as 20° in advance. The oxygen and hydrocarbon gas inlet valves may close before, or preferably, somewhat after bottom center, as for example, 10° or even as much as 20° thereafter. The ignition point 40 depends on known principles of engine design and operation which, per se, form no part of the present invention. Therefore, spark timing is preferably adjusted for development of maximum mechanical energy with due regard to engine speed and other engine characteristics.

*Example*

Natural gas is used as fuel in an engine gas generator. The composition of the natural gas follows:

| | Mol percent |
|---|---|
| Methane | 84.6 |
| Ethane | 7.3 |
| Propane | 5.1 |
| Carbon dioxide | 1.6 |
| Air | 1.4 |

The gas is admitted to the cylinder of the engine from an intake manifold maintained at 53 pounds per square inch gauge. Oxygen of 99.5 mol percent purity is introduced from an intake manifold maintained at 77 pounds per square inch gauge. The natural gas and oxygen are fed in the relative ratio of 1.50 O/C or 0.75 mol of oxygen per mol of carbon in the feed gas. Steam at 60 pounds per square inch gauge is used as purge.

The product gas is discharged from the engine at 40 pounds per square inch gauge. The product gas has the following composition:

| | Mol percent |
|---|---|
| Carbon monoxide | 32.0 |
| Carbon dioxide | 8.2 |
| Hydrogen | 59.2 |
| Nitrogen | 0.4 |
| Methane | 0.2 |

The steam purge results in smooth, predictable operation without carbon formation. There is no tendency of the engine to misfire or knock. No trouble is experienced with spontaneous ignition.

As above indicated, the invention especially contemplates feeding the engine with a normally gaseous hydrocarbon such as methane, and the $C_2$—$C_4$ hydrocarbons, such, for example, as are found in natural gas. Broadly, however, the feed may include gasiform or vaporform hydrocarbons, for instance, normally liquid hydrocarbons which are fed in a gasiform condition under a substantial preheat.

Preheating of either or all the reactants and steam to temperatures of 300–600° F. and higher is specifically contemplated as a means of improving thermal efficiency. It is to be understood that in spite of the preheating, the temperature of the steam is substantially lower than that of the residual combustion mixture so that an initial cooling or quenching occurs to a range at which uncontrolled ignition is inhibited. Therefore, it is manifest that the present process enables a substantial and desirable preheating of the reactants without the misfiring or preignition tendency which otherwise would accompany the simultaneous introduction of relatively high temperature methane and oxygen streams into the combustion zone.

The feed stream of oxygen is, as previously emphasized, advantageously enriched or rectified gas composed predominantly of molecular or free oxygen. Preferably, it contains over 80% and desirably over 90–95% oxygen. As a result, the product may comprise a high purity mixture of hydrogen and carbon monoxide substantially free from difficultly removable contaminating gases, such as nitrogen.

The ratio of oxygen to hydrocarbon for the production of the desired synthesis gas forms, per se, no part of the present invention, but is determined in general by the stoichiometric proportions indicated for partial combustion to form maximum hydrogen and carbon monoxide. However, as is known in the production of combustion engine generator gas, from the standpoint of yield, a slight excess of oxygen is usually advantageous. The preferred range of feed proportions to achieve these objectives is best expressed in terms of the atomic O/C ratio of the total reactants supplied. Optimum yield for a typical engine ordinarily occurs with an O/C feed ratio of about 1.0:1 to about 2.5:1. In each instance, however, the most appropriate ratio for maximum yield depends upon the specific characteristics of the engine and is best determined by actual trial.

In spite of the fact that the detailed examples have been given in terms of a four-stroke cycle engine, it should be apparent that the disclosure in its broadest aspect is not so limited since injection of the reactants may be effected prior to, during, or after compression and before ignition, in accordance with known engine practice. For example, provision may be made for injecting steam, methane and oxygen at the bottom of the exhaust stroke in a two-cycle engine such that the oxygen and methane are admitted after steam injection.

The injection of the steam results in metered inclusion of a predetermined amount of water vapor in the reactant mixture, which is subjected to ignition. In general, the proportion of water vapor which may be included may range up to about 100 percent of the molar volume of free molecular oxygen supplied to the engine.

In the illustrated description above, the preferred valve shrouding is aligned to produce a unidirectional swirl. As there intimated, however, the highly desirable intimate admixing of the reactants may be realized by arranging the valve shrouds in rotationally opposed directions so as to induce opposing swirling of the introduced reactants. Actually, it appears at the present time that opposed swirling provides somewhat more thorough mixing. Accordingly, the invention contemplates any combination of swirling actions effective to realize the desired mixing and combustion.

Obviously, many modifications and variations of the invention as hereinbefore set forth may be made without departing from the spirit and scope thereof, and therefore only such limitations should be imposed as are indicated in the appended claims.

I claim:

1. In the combustion engine generation of hydrogen and carbon monoxide by the reaction of a hydrocarbon with free oxygen wherein said reactants are charged to the combustion space of a cyclically operating internal combustion engine in approximate relative proportions for the formation of a partial combustion product composed essentially of hydrogen and carbon monoxide, compressed therein, subjected to internal combustion with the generation of mechanical energy, and the product hydrogen and carbon monoxide thereafter exhausted as a relatively pure stream, the improvement which comprises initiating the introduction of said reactants to the combustion space of said engine substantially simultaneously, simultaneously charging substantially the entire charge of said reactants to the combustion space, and purging the combustion space by charging steam thereto during the latter portion of the period in which the products of reaction are exhausted therefrom.

2. The method according to claim 1 wherein said hydrocarbon is a hydrocarbon gas.

3. The method according to claim 1 wherein steam is charged to said combustion space under pressure during the latter portion of the period in which product hydrogen and carbon monoxide are exhausted therefrom such that residual products of reaction are positively swept from the combustion space by the admitted steam, and thereafter a fresh charge of reactants is admitted to said combustion space.

References Cited in the file of this patent

UNITED STATES PATENTS

| | | |
|---|---|---|
| 1,107,582 | Brownlee et al. | Aug. 18, 1914 |
| 2,166,094 | Johnson et al. | July 11, 1939 |
| 2,230,467 | Nelly et al. | Feb. 4, 1941 |
| 2,484,249 | Ruble | Oct. 11, 1949 |
| 2,543,791 | Malin | Mar. 6, 1951 |
| 2,556,835 | Barr | June 12, 1951 |